US008826651B2

(12) United States Patent
Laube et al.

(10) Patent No.: US 8,826,651 B2
(45) Date of Patent: Sep. 9, 2014

(54) EXHAUST SYSTEM FOR AN INTERNAL COMBUSTION ENGINE

(75) Inventors: Thomas Laube, Leonberg (DE); Erwin Rutschmann, Tiefenbronn (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 355 days.

(21) Appl. No.: 12/829,489

(22) Filed: Jul. 2, 2010

(65) Prior Publication Data

US 2011/0000201 A1 Jan. 6, 2011

(30) Foreign Application Priority Data

Jul. 6, 2009 (DE) ........................ 10 2009 032 215

(51) Int. Cl.

| | |
|---|---|
| ***F01N 3/00*** | (2006.01) |
| ***F01N 13/08*** | (2010.01) |
| ***F16K 17/00*** | (2006.01) |
| ***F01N 1/16*** | (2006.01) |
| ***F01N 5/00*** | (2006.01) |
| ***F01N 1/00*** | (2006.01) |
| ***F01N 1/02*** | (2006.01) |

(52) U.S. Cl.
USPC .................. 60/299; 60/297; 60/288; 60/311; 60/313; 60/324; 181/228; 181/250; 181/237; 181/254; 181/247; 181/241; 181/212; 181/211

(58) Field of Classification Search
CPC ...... F01N 1/165; F01N 2410/00; F01N 13/04
USPC ........... 60/299, 310–324, 287, 297, 288, 228, 60/250, 237, 254, 247, 241, 212, 211; 181/253, 254, 228, 250, 237, 247, 241, 181/212, 211; 123/184.53
See application file for complete search history.

(56) References Cited

U.S. PATENT DOCUMENTS

| | | | | |
|---|---|---|---|---|
| 4,685,291 | A * | 8/1987 | Ha | 60/286 |
| 5,123,243 | A * | 6/1992 | Baddour | 60/274 |
| 5,144,799 | A | 9/1992 | Barth | |
| 5,325,666 | A * | 7/1994 | Rutschmann | 60/302 |
| 5,444,978 | A | 8/1995 | Yoshizaki et al. | |
| 6,182,446 | B1 * | 2/2001 | Gunther et al. | 60/278 |
| 7,703,574 | B2 | 4/2010 | Krueger et al. | |

(Continued)

FOREIGN PATENT DOCUMENTS

| | | | |
|---|---|---|---|
| DE | 19529835 | A1 * | 2/1997 |
| DE | 102 44 021 | A1 | 4/2004 |

(Continued)

OTHER PUBLICATIONS

English Machine Translation of DE19529835A1.*

(Continued)

*Primary Examiner* — Thomas Denion
*Assistant Examiner* — Anthony Ayala Delgado
(74) *Attorney, Agent, or Firm* — RatnerPrestia

(57) ABSTRACT

An exhaust system for an internal combustion engine having a first exhaust tract assigned to a first group of cylinders of the internal combustion engine, and a second exhaust tract assigned to a second group of cylinders of the internal combustion engine, the first exhaust tract and the second exhaust tract being coupled to one another by a connecting line. A common bypass line branches off from the connecting line coupling the exhaust tracts.

14 Claims, 4 Drawing Sheets

(56) References Cited

U.S. PATENT DOCUMENTS

| | | | | |
|---|---|---|---|---|
| 2002/0033302 | A1 * | 3/2002 | Kaneko et al. | 181/232 |
| 2006/0037814 | A1 * | 2/2006 | Mabuchi et al. | 181/272 |
| 2009/0004083 | A1 * | 1/2009 | Valentine et al. | 423/239.2 |
| 2009/0229912 | A1 * | 9/2009 | Hara et al. | 181/254 |

FOREIGN PATENT DOCUMENTS

| | | | |
|---|---|---|---|
| DE | 10 2007 026 812 | A1 | 6/2007 |
| EP | 1400666 | A1 | 3/2004 |
| EP | 2000643 | A1 | 12/2008 |
| GB | 2 161215 | A | 1/1986 |
| JP | 9264125 | A | 10/1997 |
| JP | 2006336537 | A | 12/2006 |

OTHER PUBLICATIONS

German Search Report dated Jun. 22, 2010, application No. 10 2009 032 215.9.

European Search Report dated Oct. 10, 2010, application No. EP 10 00 5111.

* cited by examiner

EXHAUST SYSTEM FOR AN INTERNAL COMBUSTION ENGINE

CROSS REFERENCE TO RELATED APPLICATIONS

This U.S. patent application claims priority to German Application DE 10 2009 032 215.9, filed Jul. 6, 2009, which is incorporated by reference herein in its entirety.

FIELD OF THE INVENTION

The invention relates to an exhaust system for an internal combustion engine.

BACKGROUND OF THE INVENTION

DE 102 44 021 A1 and DE 10 2007 026 812 A1 have each disclosed exhaust systems for an internal combustion engine in which a first group of cylinders of the internal combustion engine is assigned a first exhaust tract of the exhaust system, and a second group of cylinders of the internal combustion engine is assigned a second exhaust tract of the exhaust system. According to DE 102 44 021 A1, each exhaust tract of the exhaust system comprises an exhaust gas purification device, namely a catalytic converter, and two silencers arranged on the outlet side of the exhaust gas purification device, namely a first silencer arranged on the outlet side of the respective exhaust gas purification device and a second silencer arranged on the outlet side of the respective first silencer. The two exhaust tracts of the exhaust system are connected to one another by a connecting line, which provides a sound transmission device, the connecting line and hence the sound transmission device engaging on the exhaust tracts downstream of the exhaust gas purification devices and upstream of the first silencers, as seen in the direction of flow of the exhaust gas, and interconnecting them, more specifically in accordance with the position of a flap assigned to the connecting line and hence the sound transmission device. According to DE 10 2007 026 812 A1, there are two connecting lines or sound transmission devices, via which the exhaust tracts are coupled to one another.

SUMMARY OF THE INVENTION

Taking this as a starting point, it is an object of the invention presented here to provide a novel exhaust system for an internal combustion engine. This object is achieved by means of an exhaust system for an internal combustion engine having a first exhaust tract assigned to a first group of cylinders of the internal combustion engine, and a second exhaust tract assigned to a second group of cylinders of the internal combustion engine, the first exhaust tract and the second exhaust tract being coupled to one another by a connecting line, wherein a common bypass line branches off from the connecting line coupling the exhaust tracts. According to aspects of the invention, a common bypass line branches off from the connecting line coupling the exhaust tracts.

BRIEF DESCRIPTION OF THE DRAWINGS

Preferred developments of the invention will emerge from the following description. Illustrative embodiments of the invention are explained in greater detail with reference to the drawing, without being limited thereto. In the drawing.

DETAILED DESCRIPTION OF THE PREFERRED EMBODIMENTS

Figure 1:
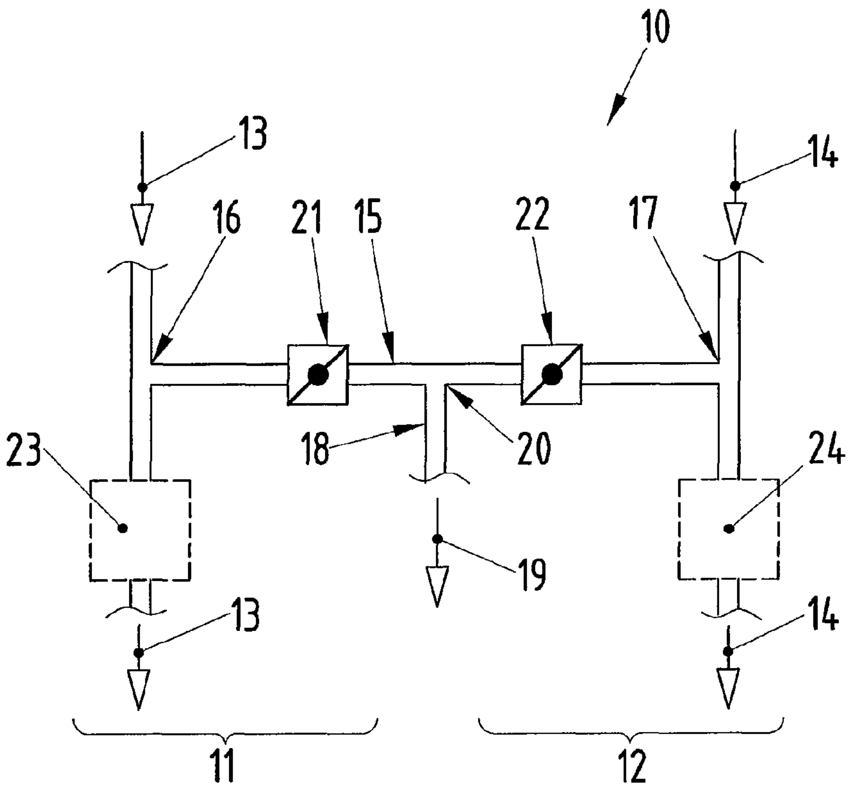
FIG. 1: shows a schematized representation of a first illustrative embodiment of an exhaust system according to aspects of the invention.

FIG. 1 shows a portion of an exhaust system 10 according to aspects of the invention for an internal combustion engine in accordance with a first illustrative embodiment of the invention, the exhaust system 10 in FIG. 1 comprising two exhaust tracts 11, 12, namely a first exhaust tract 11, assigned to a first group of cylinders (not shown) of the internal combustion engine, and a second exhaust tract 12, assigned to a second group of cylinders (likewise not shown) of the internal combustion engine. The direction of flow of the exhaust gas through the exhaust tracts 11 and 12 is indicated by arrows 13 and 14.

The two exhaust tracts 11 and 12 of the exhaust system 10 shown in FIG. 1 are coupled to one another by a connecting line 15. The connecting line 15 is coupled to the first exhaust tract 11 via a first point of connection 16 and to the second exhaust tract 12 via a second point of connection 17. Via the connecting line 15, exhaust gas can be transferred between the two exhaust tracts 11 and 12.

According to aspects of the invention, a common bypass line 18 branches off from the connecting line 15 coupling the exhaust tracts 11 and 12. Exhaust gas coming from the first exhaust tract 11, which is diverted from the latter via the connecting line 15, and exhaust gas coming from the second exhaust tract 12, which is diverted from the latter via the connecting line 15, can be carried away via the common bypass line 18, the flow of exhaust gas through the bypass line 18 being indicated by an arrow 19.

According to FIG. 1, the common bypass line 18 branches off from the connecting line 15 at a point of connection 20. According to FIG. 1, the connecting line 15 is assigned a total of two shut-off devices 21 and 22, namely a first shut-off device 21 between the point of connection 16 of the connecting line 15 to the first exhaust tract 11 and the point of connection 20 of the common bypass line 18 to the connecting line 15, and a second shut-off device 22 between the point of connection 17 of the connecting line 15 to the second exhaust tract 12 and the point of connection 20 of the common bypass line 18 to the connecting line 15. The shut-off devices 21 and 22 can be closed and opened uniformly or non-uniformly. Thus it is possible to open both shut-off devices 21 and 22, in which case exhaust gas passes from both exhaust tracts 11 and 12 via the connecting line 15 into the common bypass line 18. It is likewise possible to open just one of the two shut-off devices 21 and 22 and to keep the other shut-off device 22, 21 closed, in which case exhaust gas passes from just one exhaust tract 11 or 12 via the connecting line 15 into the common bypass line 18.

In the illustrative embodiment shown in FIG. 1, the connecting line 15 to the first exhaust tract 11 and to the second exhaust tract 12 is in each case coupled to said exhaust tract in the region of an exhaust pipe section of the respective exhaust tract 11 or 12. Accordingly, the points of connection 16 and 17 of the connecting line 15 to the exhaust tracts 11 and 12 are in an exhaust pipe section thereof.

From FIG. 1 it can be seen that a subassembly 23 or 24 of the respective exhaust tract 11 or 12 can be assigned to both exhaust tract 13 and exhaust tract 14 downstream of the respective point of connection 16 or 17 of the connecting line 15 to the respective exhaust tract 11 or 12, as seen in the direction of flow of the exhaust gas, it being possible for the subassemblies 23 and 24 to be either exhaust gas purification devices or catalytic converters or else silencers.

In the illustrative embodiment shown in FIG. 1, the common bypass line 18 opens to atmosphere downstream of the connecting line 15, as seen in the direction of flow of the exhaust gas.

Figure 2:
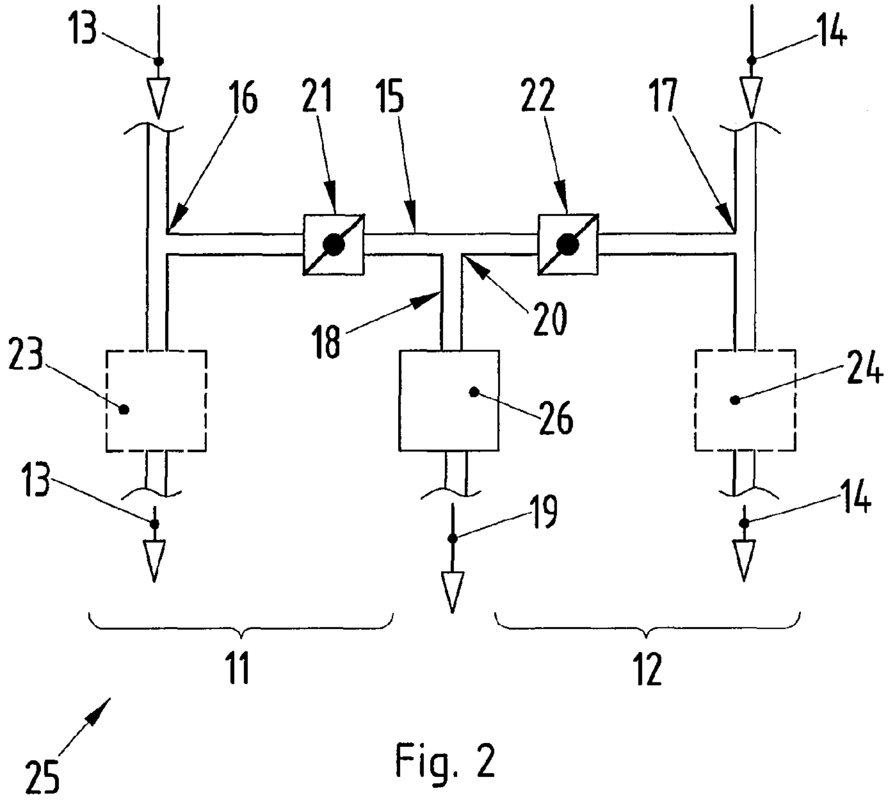
FIG. 2: shows a schematized representation of a second illustrative embodiment of an exhaust system according to aspects of the invention.

FIG. 2 shows an illustrative embodiment of an exhaust system 25 in which, in contrast to the illustrative embodiment in FIG. 1, the common bypass line 18 does not open directly to atmosphere downstream of the connecting line 15 but, on the contrary, into a subassembly 26 assigned to the common bypass line 18, it being possible for the subassembly 26 to be an exhaust gas purification device or catalytic converter or else a silencer. As regards the remaining details, the exhaust system 25 in FIG. 2 corresponds to the exhaust system 10 in FIG. 1, for which reason, to avoid unnecessary repetition, identical references signs are used for identical subassemblies and attention is drawn to the explanations given in connection with the illustrative embodiment in FIG. 1. To avoid unnecessary repetition, identical reference signs to those used in the illustrative embodiment in FIG. 1 are also used for identical subassemblies in the following illustrative embodiments in FIGS. 3 to 8.

Figure 3:
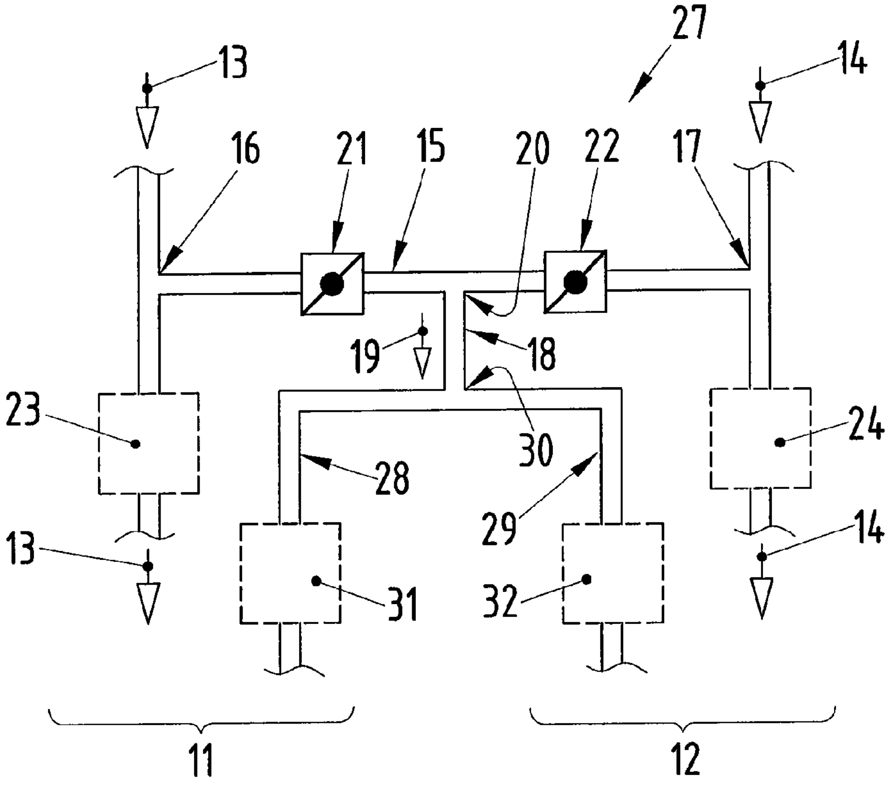
FIG. 3: shows a schematized representation of a third illustrative embodiment of an exhaust system according to aspects of the invention.

FIG. 3 shows a further illustrative embodiment of an exhaust system 27 according to aspects of the invention, in which the common bypass line 18 branches into two bypass branch lines 28 and 29 downstream of the connecting line 15, as seen in the direction of flow (arrow 19) of the exhaust gas, it being possible for bypass branch line 28 to be counted as part of exhaust tract 11 and bypass branch line 29 to be counted as part of exhaust tract 12.

Downstream of a point 30 where the common bypass line 18 branches into the bypass branch lines 28 and 29, the bypass branch lines can open directly to atmosphere. However, as FIG. 3 shows, it is also possible for the bypass branch lines 28 and 29 to be assigned further subassemblies 31 and 32, it being possible for the subassemblies 31 and 32 to be exhaust gas purification devices or catalytic converters or silencers.

Accordingly, it is possible, in the illustrative embodiment in FIG. 3, for each bypass branch line 28 and 29 to be assigned a dedicated exhaust gas purification device 31 and 32 respectively, with the result that, on the one hand, each bypass branch line 28 and 29 opens into a separate exhaust gas purification device 31 and 32 downstream of the point 30 where the common bypass line 18 branches into the bypass branch lines 28, 29 and, on the other hand, each exhaust tract 11 and 12 opens into a separate exhaust gas purification device 23 or 24 downstream of the points of connection 16 and 17 of the connecting line 15 to the respective exhaust tract 11 or 12, as seen in the direction of flow of the exhaust gas.

It is likewise possible, in the illustrative embodiment in FIG. 3, for each bypass branch line to be assigned a dedicated silencer 31 and 32 respectively, with the result that, on the one hand, each bypass branch line 28 and 29 opens into a separate silencer 31 and 32, respectively, downstream of the point 30 where the common bypass line 18 branches into the bypass branch lines 28 and 29 and, on the other hand, each exhaust tract 11 and 12 opens into a separate silencer 23 and 24 downstream of the points of connection 16 and 17 of the connecting line 15 to the exhaust tracts 11 and 12, as seen in the direction of flow of the exhaust gas.

Figure 4:
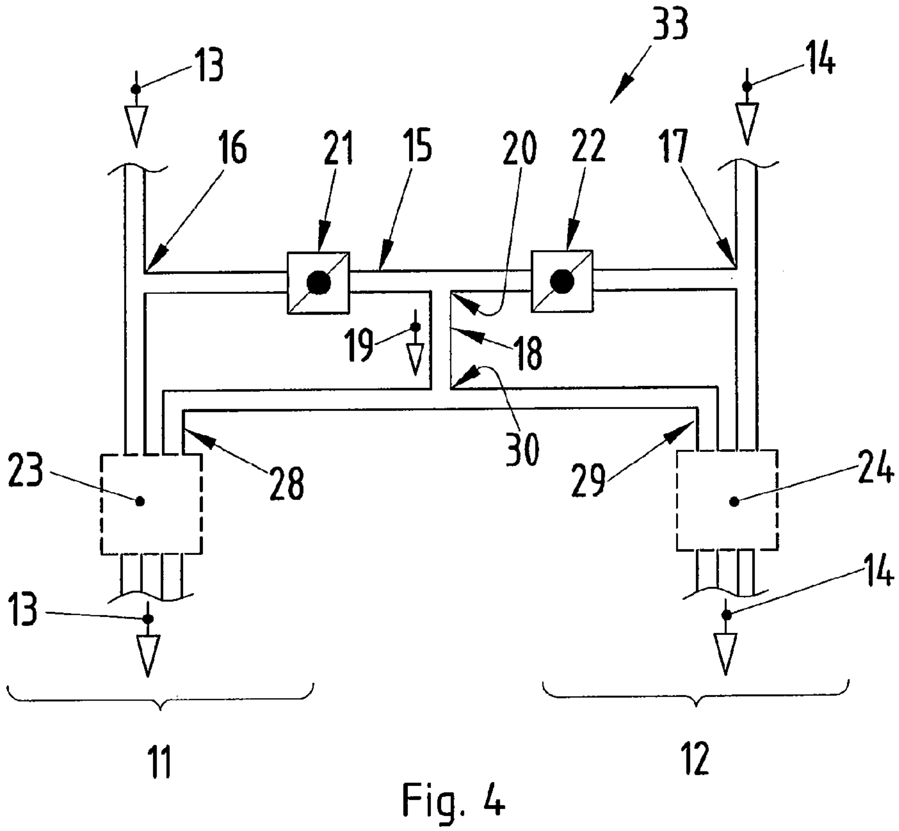
FIG. 4: shows a schematized representation of a fourth illustrative embodiment of an exhaust system according to aspects of the invention.

FIG. 4 shows a further illustrative embodiment of an exhaust system 33 according to aspects of the invention, the common bypass line 18 of which again branches downstream of the connecting line 15 into two bypass branch lines 28 and 29 although, in the illustrative embodiment in FIG. 4, each bypass branch line 28 and 29 opens downstream of the branch point 30 into the same subassembly 23 or 24 as exhaust tract 11 or 12, of which the respective bypass branch line 28 or 29 can be counted as being a part.

In the illustrative embodiment in FIG. 4, it is thus possible for each bypass branch line 28 and 29 to open into an exhaust gas purification device 23 or 24, into which the exhaust tract 11 or 12 opens downstream of the point of connection 16 or 17 of the connecting line 15 to the respective exhaust tract 11 or 12, as seen in the direction of flow of the exhaust gas.

In the illustrative embodiment in FIG. 4, it is likewise possible for each bypass branch line 28 and 29 to open into a silencer 23 or 24, into which the respective exhaust tract 11 or 12 also opens downstream of the respective point of connection 16 or 17 of the connecting line 15 to the respective exhaust tract 11 or 12.

The feature common to the illustrative embodiments in FIGS. 1 to 4 is that the exhaust-system connecting line 15 to the exhaust tracts 11 and 12 is in each case coupled to the said exhaust tracts in the region of an exhaust pipe section of the respective exhaust tract 11 or 12. In the illustrative embodiments in FIGS. 1 to 4, the points of connection 16 and 17 of the connecting line 15 are accordingly assigned to exhaust pipe sections of the respective exhaust tract 11 or 12 of the respective exhaust system.

Figure 5:
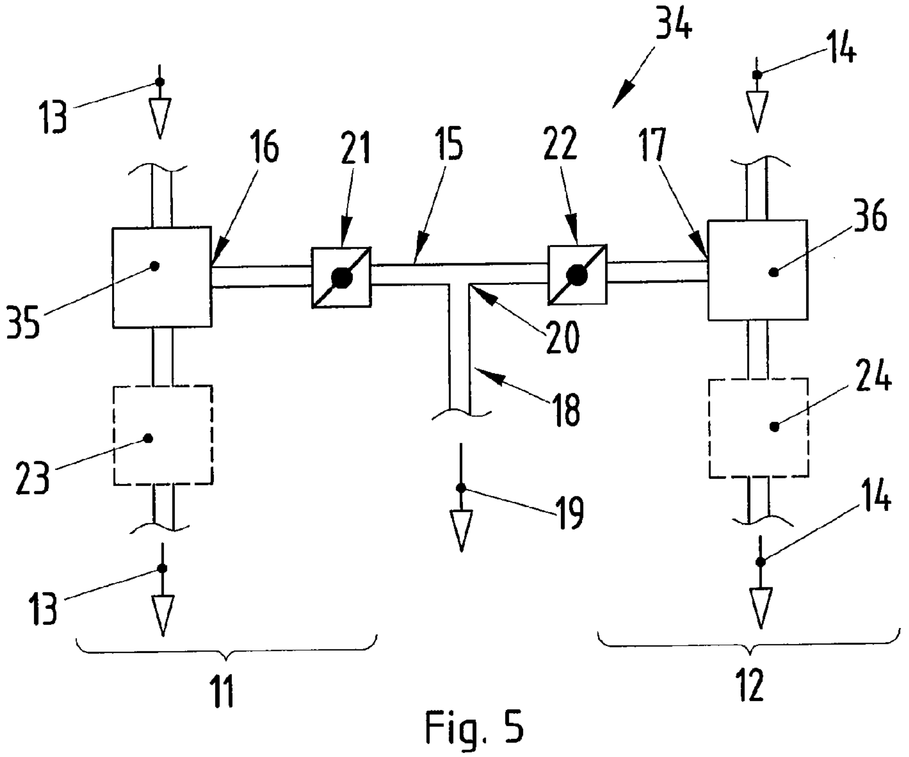
FIG. 5: shows a schematized representation of a fifth illustrative embodiment of an exhaust system according to aspects of the invention.

FIG. 5, in contrast, shows an illustrative embodiment of an exhaust system 34 in which the connecting line 15 to the first exhaust tract 11 and to the second exhaust tract 12 is in each case coupled to the respective exhaust tract 11 or 12 in the region of a subassembly 35 or 36 assigned to exhaust tract 11 or 12, it being possible for the subassemblies 35 and 36 to be exhaust gas purification devices or catalytic converters or else silencers. In the illustrative embodiment in FIG. 5, the points of connection 16, 17 are accordingly not assigned to an exhaust pipe section of the respective exhaust tract 11 or 12 but, on the contrary, to an exhaust gas purification device or a silencer in the respective exhaust tract 11 or 12. As regards all the other details, the illustrative embodiment in FIG. 5 corresponds to the illustrative embodiment in FIG. 1. The coupling of the connecting line 15 to exhaust tracts 11 and 12 in the region of an exhaust gas purification device or a silencer can also be employed in the illustrative embodiments in FIGS. 2 to 4.

Figure 6:
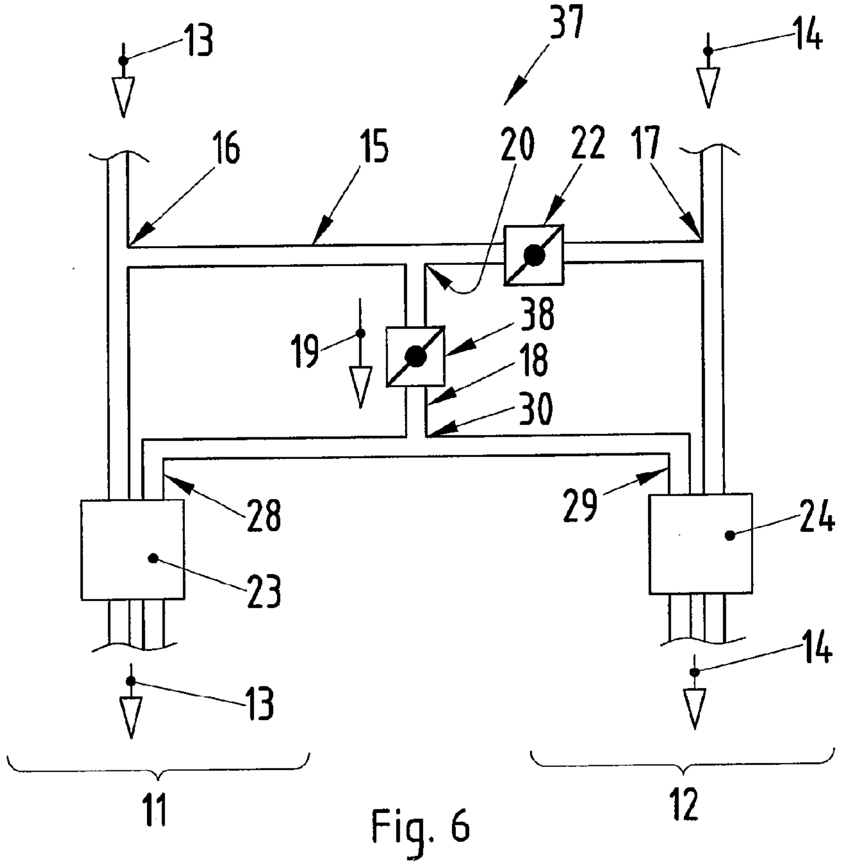
FIG. 6: shows a schematized representation of a sixth illustrative embodiment of an exhaust system according to aspects of the invention.

FIG. 6 shows a further illustrative embodiment of an exhaust system 37 according to aspects of the invention, the exhaust system 37 in FIG. 6 corresponding substantially to the exhaust system 33 in FIG. 4. The exhaust system 37 in FIG. 6 differs from the exhaust system 33 in FIG. 3 in that the connecting line 15 in the exhaust system 37 in FIG. 6 is not assigned two shut-off devices; on the contrary, in the illustrative example in FIG. 6 the connecting line 15 is assigned just one shut-off device 22. In addition, the common bypass line 18 is assigned a shut-off device 38. The shut-off device 38 assigned to the common bypass line 18 can be used to close the common bypass line 18 and, as a result, when the shut-off device 22 assigned to the connecting line 15 is opened, exhaust gas is exchanged exclusively between the exhaust tracts 11 and 12, without exhaust gas flowing via the common bypass line 18 and hence via the bypass branch lines 28 and 29, however. Thus, in the illustrative embodiment in FIG. 6, the shut-off device 22 assigned to the connecting line 15 is placed between the point of connection of the common bypass line 18 to the connecting line 15 and the point of connection 17 of the connecting line 15 to the second exhaust tract 12. In contrast therewith, it is also possible to place the shut-off device assigned to the connecting line 15 between the point of connection 20 of the common bypass line 18 to the connecting line 15 and the point of connection 16 of the connecting line 15 to the first exhaust tract 11.

The arrangement of the shut-off devices 22 and 38 in the connecting line 15 and in the common bypass line 18 can also be employed in the illustrative embodiments in FIGS. 1 to 5 as well as 6 and 7.

Figure 7:
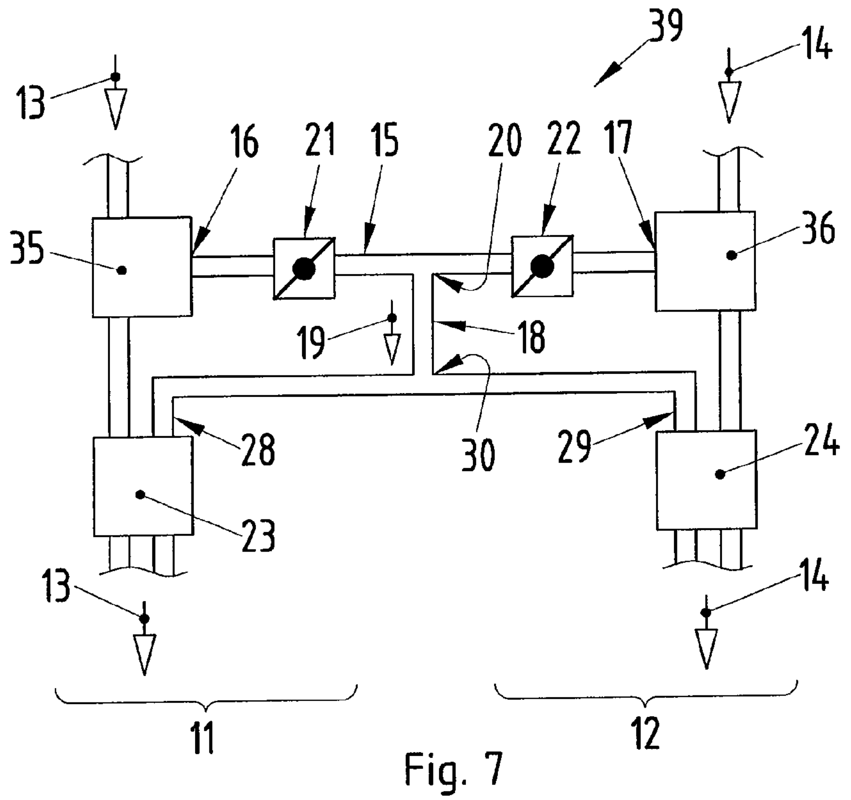
FIG. 7: shows a schematized representation of a seventh illustrative embodiment of an exhaust system according to aspects of the invention.

FIG. 7 shows a further illustrative embodiment of an exhaust system 39 according to aspects of the invention and, in the illustrative embodiment in FIG. 7, the features of the illustrative embodiments in FIGS. 4 and 5 are combined. Thus, in the illustrative embodiment in FIG. 7, the points of connection 16 and 17 of the connecting line 15 to the exhaust tracts 11 and 12 are once again not assigned to exhaust pipe sections but to an exhaust gas purification device or silencer 35 and 36. Furthermore, the common bypass line 18 is branched into bypass branch lines 28 and 29 which open into the same exhaust gas purification device or the same silencer 23 or 24 as the exhaust tracts 11, 12, downstream of the points of connection 16, 17.

Figure 8:
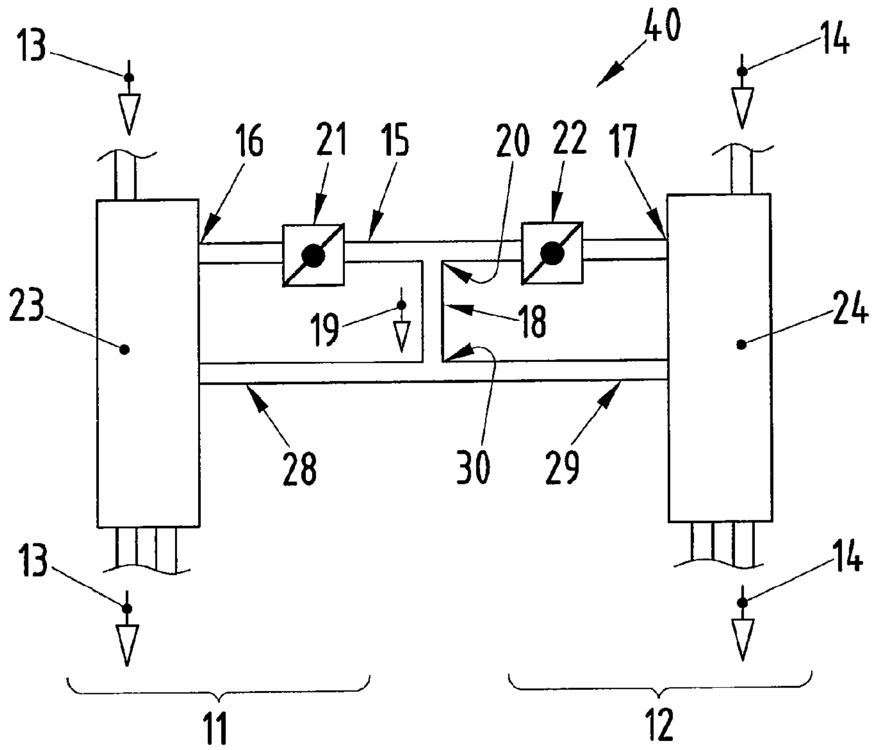
FIG. 8: shows a schematized representation of an eighth illustrative embodiment of an exhaust system according to aspects of the invention.

A further illustrative embodiment of an exhaust system 40 according to aspects of the invention is shown in FIG. 8, and the illustrative embodiment in FIG. 8 differs from the illustrative embodiment in FIG. 7 in that the bypass branch lines 28 and 29 open into the same subassembly 23 and 24 or are routed through the same subassemblies 23 and 24 from which the connecting line 15 branches.

LIST OF REFERENCE SIGNS

10 Exhaust system
11 Exhaust tract
12 Exhaust tract
13 Direction of exhaust gas flow
14 Direction of exhaust gas flow
15 Connecting line
16 Point of connection
17 Point of connection
18 Common bypass line
19 Direction of exhaust gas flow
20 Point of connection
21 Shut-off device
22 Shut-off device
23 Exhaust gas purification device/silencer
24 Exhaust gas purification device/silencer
25 Exhaust system
26 Exhaust gas purification device/silencer
27 Exhaust system
28 Bypass branch line
29 Bypass branch line
30 Branch point
31 Exhaust gas purification device/silencer
32 Exhaust gas purification device/silencer
33 Exhaust system
34 Exhaust system
35 Exhaust gas purification device/silencer
36 Exhaust gas purification device/silencer
37 Exhaust system
38 Shut-off device
39 Exhaust system
40 Exhaust system

The invention claimed is:

1. An exhaust system for an internal combustion engine comprising a first exhaust tract assigned to a first group of cylinders of the internal combustion engine, and a second exhaust tract assigned to a second group of cylinders of the internal combustion engine, the first exhaust tract and the second exhaust tract being coupled to one another by a connecting line, wherein a common bypass line branches off from the connecting line for coupling the exhaust tracts, such that exhaust gas emanating through the first exhaust tract is also branched off from and bypasses the first exhaust tract via the connecting line, and exhaust gas emanating through the second exhaust tract is also branched off from and bypasses the second exhaust tract via the connecting line, and the exhaust gas is discharged from the connecting line via the common bypass line, wherein the common bypass line opens into either a silencer or an exhaust gas purification device downstream of the connecting line, with respect to a direction of flow of exhaust gas, wherein the connecting line is assigned a first shut-off device between a point of connection of the connecting line to the first exhaust tract and a point of connection of the common bypass line to the connecting line, and a second shut-off device between a point of connection of the connecting line to the second exhaust tract and the point of connection of the common bypass line to the connecting line.

2. An exhaust system for an internal combustion engine comprising a first exhaust tract assigned to a first group of cylinders of the internal combustion engine, and a second exhaust tract assigned to a second group of cylinders of the internal combustion engine, the first exhaust tract and the second exhaust tract being coupled to one another by a connecting line, wherein a common bypass line branches off from the connecting line for coupling the exhaust tracts, such that exhaust gas emanating through the first exhaust tract is also branched off from and bypasses the first exhaust tract via the connecting line, and exhaust gas emanating through the second exhaust tract is also branched off from and bypasses the second exhaust tract via the connecting line, and the exhaust gas is discharged from the connecting line via the common bypass line, wherein the common bypass line branches into at least two bypass branch lines downstream of the connecting line, with respect to a direction of flow of exhaust gas, wherein the connecting line is assigned a first shut-off device between a point of connection of the connecting line to the first exhaust tract and a point of connection of the common bypass line to the connecting line, and a second shut-off device between a point of connection of the connecting line to the second exhaust tract and the point of connection of the common bypass line to the connecting line.

3. The exhaust system as claimed in claim 2, wherein each bypass branch line opens to atmosphere downstream of a branch point in the common bypass line, with respect to a direction of flow of exhaust gas.

4. The exhaust system as claimed in claim 2, wherein each bypass branch line opens into an exhaust gas purification device downstream of a branch point in the common bypass line, as seen in the direction of flow of the exhaust gas.

5. The exhaust system as claimed in claim 4, wherein each bypass branch line is assigned a dedicated exhaust gas purification device with the result that, on the one hand, each bypass branch line opens into a separate exhaust gas purification device downstream of a point where the common bypass line branches into the bypass branch lines and, on the other hand, each exhaust tract opens into a separate exhaust gas purification device downstream of a point of connection of the connecting line to the respective exhaust tract, with respect to a direction of flow of exhaust gas.

6. The exhaust system as claimed in claim 2, wherein each bypass branch line opens into a silencer downstream of a branch point in the common bypass line, with respect to a direction of flow of exhaust gas.

7. The exhaust system as claimed in claim 6, wherein each bypass branch line is assigned a dedicated silencer, with the result that, on the one hand, each bypass branch line opens into a separate silencer downstream of a point where the common bypass line branches into the bypass branch lines and, on the other hand, each exhaust tract opens into a separate silencer downstream of a point of connection of the connecting line to the respective exhaust tract, with respect to a direction of flow of exhaust gas.

8. The exhaust system as claimed in claim 1, wherein the connecting line to the first exhaust tract and to the second exhaust tract is, in each case, coupled to said exhaust tracts in a region of an exhaust pipe section of the respective exhaust tract.

9. The exhaust system as claimed in claim 1, wherein the exhaust system is configured to open the first and second shut-off devices at the same time to permit a flow of exhaust through the first exhaust tract to atmosphere, the second exhaust track to atmosphere and the bypass line to atmosphere.

10. The exhaust system as claimed in claim 1, wherein the common bypass line bypasses an exhaust purification device in both the first exhaust track and the second exhaust track.

11. The exhaust system as claimed in claim 2, wherein the common bypass line bypasses an exhaust purification device in both the first exhaust track and the second exhaust track.

12. The exhaust system as claimed in claim 1, wherein the common bypass line opens directly to atmosphere.

13. The exhaust system as claimed in claim 2, wherein the common bypass line opens directly to atmosphere.

14. The exhaust system as claimed in claim 2, wherein the exhaust system is configured to open the first and second shut-off devices at the same time to permit a flow of exhaust through the first exhaust tract to atmosphere, the second exhaust track to atmosphere and the bypass line to atmosphere.

* * * * *